United States Patent Office 2,971,764
Patented Feb. 14, 1961

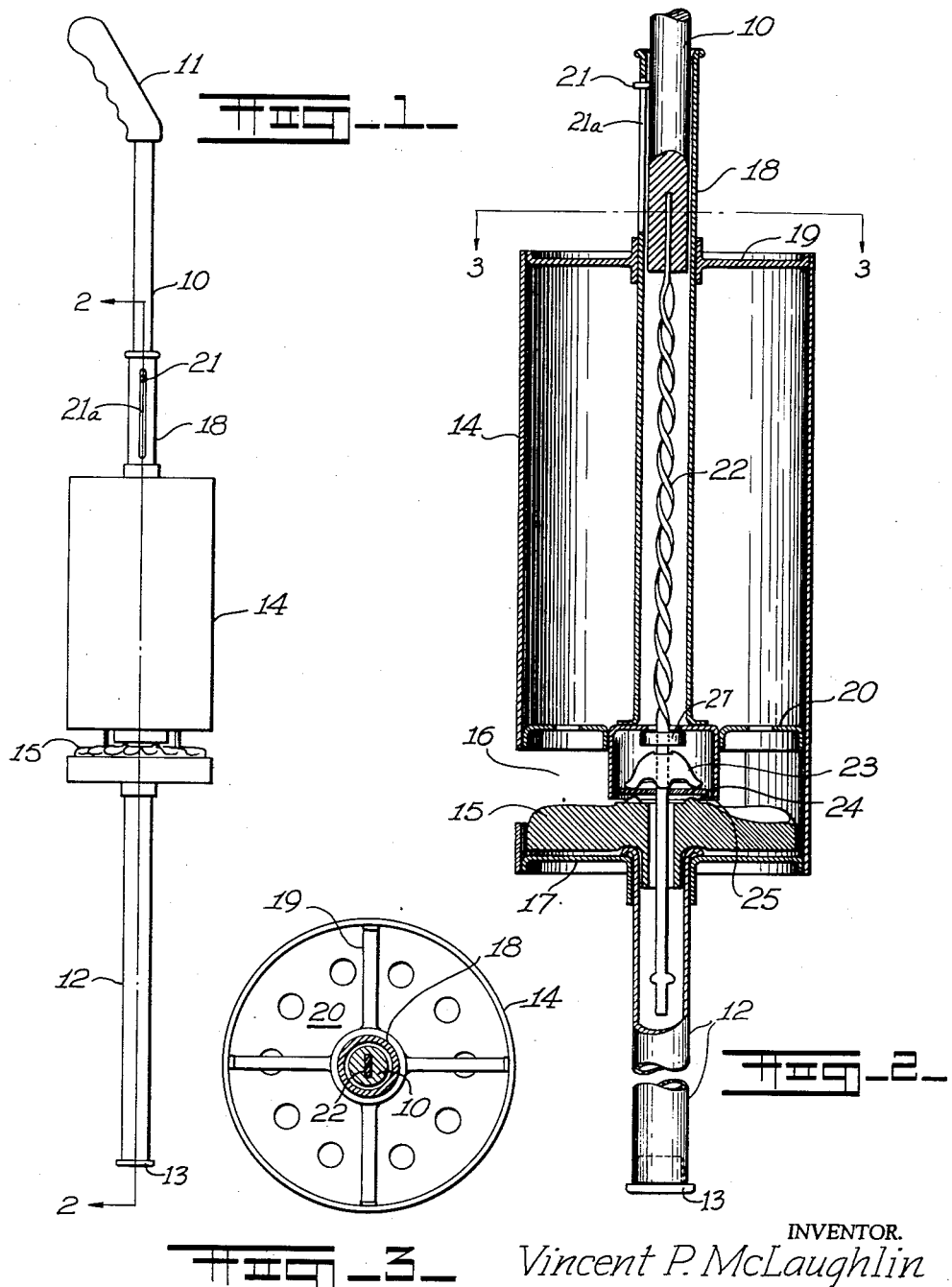

2,971,764

SPREADER FOR GRANULAR MATERIAL

Vincent P. McLaughlin, 287 Poland-Center Road, Poland 14, Ohio

Filed Dec. 18, 1958, Ser. No. 781,396

4 Claims. (Cl. 275—12)

This invention relates to a spreader for evenly dispensing salt, seeds, fertilizer and the like.

The principal object of the invention is the provision of a light weight portable spreader particularly adapted for spreading granular substances.

A still further object of the invention is the provision of a spreader including an integral hopper and rotating means for moving the contents of the hopper therefrom.

A still further object of the invention is the provision of a spreader in the form of a cane-like device which may be conveniently and easily held in a person's hand and moved vertically in a reciprocal motion to cause the contents of a hopper thereon to be discharged therefrom in an even pattern.

A still further object of the invention is the provision of a spreader that may be economically formed of a relative few simple parts.

The spreader disclosed herein comprises an improvement in portable spreaders in that a device is disclosed which is particularly suitable for spreading salt for ice control. The device incorporates a vertical cane-like body with a hopper formed thereon and a rotatable disc in the hopper for discharging the contents thereof. Means is provided between the upper and lower portions of the device, which are telescopically assembled, so that relative motion therebetween imparts spinning motion to the rotatable disc.

With the foregoing and other objects in view which will appear as the description proceeds, the invention resides in the combination and arrangement of parts and in the details of construction hereinafter described and claimed, it being the intention to cover all changes and modifications of the example of the invention herein chosen for purposes of the disclosure which do not constitute departures from the spirit and scope of the invention.

The invention is illustrated in the accompanying drawing, wherein:

Figure 1 is a side view of the spreader.

Figure 2 is a cross section on line 2—2 of Figure 1.

Figure 3 is a vertical section on line 3—3 of Figure 2.

By referring to the drawings and Figure 1 in particular it will be seen that the spreader comprises a cane-like device including an upper elongated body member 10 having a handle 11 on its uppermost end a lower elongated body member 12 with a cap 13 on its lowermost end. A cylindrical hopper 14 is mounted on the upper end of the lower body member 12 and supports a disc 15 in rotatable relation in the bottom thereof. The hopper 14 is provided with a horizontally disposed slot 16.

By referring to Figure 2 of the drawings it will be seen that the cylindrical body 14 has a bottom portion 17 and an upstanding tubular member 18 positioned centrally of its upper end by a plurality of radially extending circumferentially spaced arms 19. The cylindrical body 14 also has an apertured disc 20 positioned thereacross above the slot 16 therein. Adjacent the lower end of the upper body member 10 is a pin 21 which is reciprocally engaged in a slot 21A in the upstanding tubular member 18. A rod rectangular in cross section and having a twisted portion 22 is secured to the lower end of the upper body member 10 and extends downwardly through the upstanding tubular member 18 within the cylindrical hopper 14 and through a slotted spider 23, an apertured deformable disc 24 and through a central aperture in the disc 15 and downwardly into the hollow lower body member 12. The upper surface of the disc 15 has a plurality of circumferentially spaced bosses 25 on its uppermost surface. An annular collar 27 is loosely positioned around the rod and above the slotted spider 23.

In operation the material to be spread, such as salt for ice melting purposes, is loaded into the cylindrical hopper 14 through the open upper end thereof and the device held in vertical position by the handle 11 and positioned on the ground. The handle 11 with the upper body 10 is pushed downwardly whereupon the twisted portion 22 of the rod moves downwardly through a matching rectangular slot in the spider 23 which is thereby rotatably urged against the deformable disc 24 and the rotating motion thereof imparted therethrough to the disc 15 to cause the same to spin.

The material in the cylindrical hopper 14 feeds downwardly through the apertured disc 20 and is moved outwardly through the slot 16 by the spinning action of the disc 15. At the completion of each downward stroke of the twisted portion 22 of the rod, the handle 11, the upper body member 10 and the rod are lifted vertically whereupon the spider 23 is elevated slightly and is revolved in the opposite direction to permit the twisted section 22 of the rod to move to uppermost position. The cycle may be repeated as often as desired as each downward motion of the rod keeps the disc 15 spinning. It will be observed that the disc 15 has a central depending flange which is engaged in the upper end of the lower hollow body member 12 so that the disc 15 is maintained in desirable rotatable position in the bottom of the cylindrical hopper 14 at all times.

It will thus be seen that a simple, inexpensive and practical spreader has been disclosed which meets the several objects of the invention and having thus described my invention, what I claim is:

1. A spreader for granular material comprising a hopper, a depending body member supporting said hopper, a main disc rotatably positioned in the bottom of said hopper adjacent a slot in the wall of said hopper, a tubular member in said hopper and a body member telescopically engaged in said tubular member and extending thereabove, a twisted rod secured to said body member and extending axially thereof through said tubular member and said disc and means engaging said rod and said disc for rotating said disc when said rod is moved vertically, downwardly, said means comprising a slotted spider positioned in the bottom of said hopper on said twisted rod and co-operating with a deformable disc positioned therebeneath and on said main disc.

2. The spreader set forth in claim 1 and wherein the hopper is a cylindrical body member having an open upper end and wherein said tubular member is centrally positioned in said cylindrical hopper by a plurality of circumferentially spaced radially extending arms.

3. The spreader set forth in claim 1 and wherein said main disc has a plurality of circumferentially spaced upstanding bosses on its uppermost surface engaging said deformable disc.

4. A spreader for granular material comprising a hopper, a depending body member supporting said hopper, a portion of said body member being hollow, a main disc having an irregular upper surface rotatably positioned in the bottom of said hopper adjacent a slot in the wall of said hopper, a tubular member positioned in the upper central portion of said hopper and an elongated body member having one end telescopically engaged in said tubular member and a twisted rod secured to the lower end of said elongated body member and extending downwardly through said hopper and said main disc therein and into the hollow portion of said depending body member, an apertured resilient disc loosely positioned on said main disc in said hopper, a spider like member having a central slot therein positioned on said resilient disc, said twisted rod positioned through said slot in said spider like member and through the aperture in said apertured resilient disc whereby vertical downward movement of said elongated body member moves said twisted rod so as to rotate said spider, said deformable apertured dics and said main disc.

References Cited in the file of this patent

UNITED STATES PATENTS 2,506,382    Pazandak _____ May 2, 1950